United States Patent
Gorsica et al.

(10) Patent No.: US 11,145,315 B2
(45) Date of Patent: Oct. 12, 2021

(54) ELECTRONIC DEVICE WITH TRIGGER PHRASE BYPASS AND CORRESPONDING SYSTEMS AND METHODS

(71) Applicant: Motorola Mobility LLC, Chicago, IL (US)

(72) Inventors: John Gorsica, Round Lake, IL (US); Thomas Merrell, St. Charles, IL (US)

(73) Assignee: Motorola Mobility LLC, Chicago, IL (US)

( * ) Notice: Subject to any disclaimer, the term of this patent is extended or adjusted under 35 U.S.C. 154(b) by 128 days.

(21) Appl. No.: 16/654,802

(22) Filed: Oct. 16, 2019

(65) Prior Publication Data

US 2021/0118450 A1 Apr. 22, 2021

(51) Int. Cl.
G10L 17/22 (2013.01)
G10L 17/00 (2013.01)
H04M 1/02 (2006.01)

(52) U.S. Cl.
CPC .............. *G10L 17/22* (2013.01); *G10L 17/00* (2013.01); *H04M 1/0202* (2013.01)

(58) Field of Classification Search
CPC ....... G10L 17/22; G10L 17/00; H04M 1/0202
See application file for complete search history.

(56) References Cited

U.S. PATENT DOCUMENTS

| | | | |
|---|---|---|---|
| 10,289,381 B2 | 5/2019 | McDunn et al. | |
| 10,748,529 B1* | 8/2020 | Milden | G10L 15/22 |
| 2013/0085757 A1* | 4/2013 | Nakamura | G06F 3/167 704/254 |
| 2013/0190055 A1* | 7/2013 | Kulas | H04M 1/0202 455/566 |
| 2014/0222436 A1* | 8/2014 | Binder | G10L 17/24 704/275 |
| 2016/0019889 A1* | 1/2016 | Guevara | G10L 19/00 704/254 |
| 2016/0252963 A1* | 9/2016 | Elkins | G06F 1/1694 345/156 |
| 2016/0253998 A1* | 9/2016 | Iyer | G06F 3/167 704/275 |
| 2017/0131778 A1* | 5/2017 | Iyer | G06F 3/165 |
| 2017/0161016 A1* | 6/2017 | McDunn | G06F 3/167 |
| 2017/0180984 A1* | 6/2017 | Thomas | H04M 1/667 |

(Continued)

OTHER PUBLICATIONS

"DSP Beam Steering with Modern Line Analysis", Meyer Sound Technical Report; 2002.

(Continued)

*Primary Examiner* — Anne L Thomas-Homescu
(74) *Attorney, Agent, or Firm* — Philip H. Burrus, IV

(57) ABSTRACT

An electronic device includes an audio capture device receiving audio input. The electronic device includes one or more processors, operable with the audio capture device, and configured to execute a control operation in response to a device command preceded by a trigger phrase identified in the audio input when in a first mode of operation. The one or more processors transition from the first mode of operation to a second mode of operation in response to detecting a predefined operating condition of the electronic device. In the second mode of operation, the one or more processors execute the control operation without requiring the trigger phrase to precede the device command.

20 Claims, 5 Drawing Sheets

(56) References Cited

U.S. PATENT DOCUMENTS

| | | | |
|---|---|---|---|
| 2017/0213559 A1* | 7/2017 | Agrawal | G10L 15/22 |
| 2017/0242478 A1* | 8/2017 | Ma | H04N 9/3147 |
| 2017/0345422 A1* | 11/2017 | Yang | G10L 15/22 |
| 2018/0089131 A1* | 3/2018 | Burns | G06F 13/4068 |
| 2018/0190264 A1* | 7/2018 | Mixter | G06F 3/167 |
| 2018/0270343 A1* | 9/2018 | Rout | G06F 3/167 |
| 2018/0287809 A1* | 10/2018 | DeLapa | H04M 3/562 |
| 2019/0115018 A1* | 4/2019 | Zurek | G10L 15/22 |
| 2019/0115019 A1* | 4/2019 | Zurek | G10L 15/08 |
| 2019/0333498 A1* | 10/2019 | Xu | G10L 25/51 |
| 2020/0075140 A1* | 3/2020 | Embree | G16H 40/60 |
| 2020/0103963 A1* | 4/2020 | Kelly | G06F 3/167 |
| 2020/0175292 A1* | 6/2020 | Casado | G06K 9/00926 |
| 2020/0258518 A1* | 8/2020 | Stachura | G10L 15/08 |
| 2020/0341546 A1* | 10/2020 | Yuan | G06F 3/013 |
| 2020/0342855 A1* | 10/2020 | Casado | G10L 15/183 |
| 2021/0027776 A1* | 1/2021 | Wodrich | G10L 15/22 |
| 2021/0048944 A1* | 2/2021 | Chandrababu | H04W 4/80 |
| 2021/0058505 A1* | 2/2021 | Corsica | G06F 3/167 |
| 2021/0105619 A1* | 4/2021 | Kashani | G06F 21/32 |

OTHER PUBLICATIONS

"DSP-Driven Vertical Arrays—Acoustical, Electronic, & Mechanical Considerations", White Paper published by Renkus-Heinz; Rev B Jun. 2017.

"Facial Recognition, Proximity Sensor and Voice Recognition", Raspberry Pi Forum; Initial Post Mar. 10, 2017; Available online at https://www.raspberrypi.org/forums/viewtopic.php?t=176909.

"Samsung Convoy 4—Turn On/Off Flip Open & Talk Voice Activated Dialing", Verizon Support; Available prior to Oct. 16, 2019; Online at https://www.verizonwireless.com/support/knowledge-base-208403/.

"Triggerless Assistant—Prior Art", Art Identified by Inventors; List of known prior art available prior to filing of present application.

* cited by examiner

ELECTRONIC DEVICE WITH TRIGGER PHRASE BYPASS AND CORRESPONDING SYSTEMS AND METHODS

BACKGROUND

Technical Field

This disclosure relates generally to electronic devices, and more particularly to electronic devices having sensor devices.

Background Art

Electronic devices, and in particular portable, wireless communication devices, are becoming increasingly technologically advanced. In response, people are becoming more dependent upon their portable electronic devices. Only a few years ago a mobile telephone was a novelty item used only for making telephone calls. By contrast, people today rely upon "smartphones" to keep up with their calendars, address books, music collections, photo collections, and so forth.

These smaller, yet more powerful, devices are being used for many different applications, in many different environments, and in many different configurations. It would be advantageous to be able to detect certain environments and configurations and adapt performance of an electronic device to provide a more seamless user interface experience.

Figure 1:
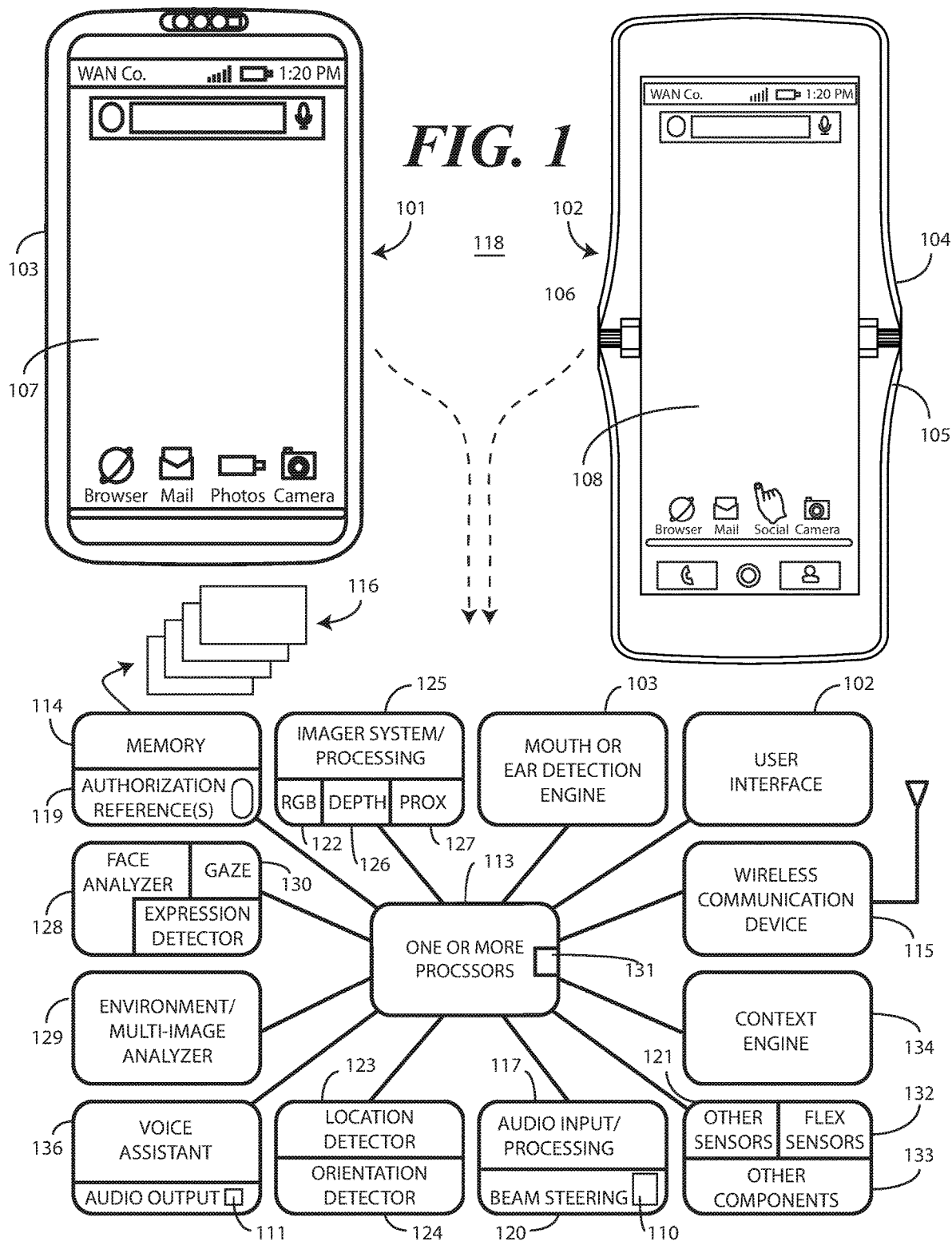
FIG. 1 illustrates one explanatory block diagram illustrating a schematic of one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to using sensor devices to bypass the requirement of a trigger phrase in a voice assistant module when a predefined operating condition of an electronic device is detected. Any process descriptions or blocks in flow charts should be understood as representing modules, segments, or portions of code that include one or more executable instructions for implementing specific logical functions or steps in the process.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of transitioning an electronic device from a first mode of operation where a trigger word or phrase is required to actuate a voice assistant to a second mode of operation where the trigger word or phrase is bypassed as described herein. The non-processor circuits may include, but are not limited to, a radio receiver, a radio transmitter, signal drivers, clock circuits, power source circuits, and user input devices. As such, these functions may be interpreted as steps of a method to transition the electronic device from the first mode of operation, which requires the trigger word or phrase, to a second mode of operation, in which the trigger word or phrase is bypassed.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within one percent and in another embodiment within 0.5 percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure contemplate that users of electronic devices would prefer to have simplified ways of interacting with those devices that more seamlessly integrate into their daily lifestyles, and with the general human experience as a whole. For example, when a person asks another person a question, simply annunciating the question is all that is required. Retrieving information from an electronic device is not so simple. To figure out, for instance, how tall the Willis Tower is using a smartphone, a user needs to unlock the device, navigate the user interface to a web browser, type in the question, wait for the response to load, and then read the response. To be sure, communicating with prior art devices is not as seamless as communicating with a person.

There have been some advances in electronic devices recently that have simplified things a bit. Many smartphones and other electronic devices have voice-controlled interfaces. These electronic devices are equipped with voice assistant capabilities that allow authorized users to access data and retrieve information using voice commands rather than physically manipulating the electronic device. Rather than typing a question into a web browser, a user can ask an automated voice control engine a question. However, prior to doing so, the user must activate the automated voice control engine. Even after doing so, the user must say a "trigger phrase" to queue the automated voice control engine to listen.

Using an Android.sup.™ device, for instance, a user might need to say, "OK, Google Now, how tall is the Willis Tower?" In this question, "OK, Google Now" is the trigger phrase that actuates the voice assistant capability, letting the voice assistant know that the words following the trigger phrase will constitute a device command requiring the electronic device to execute a control operation. In this example, the device command is "how tall is the Willis Tower." The control operation would be retrieving responsive information from a local or remote data store, and delivering it to the user. By using the voice assistant and trigger phrase, the user can obtain the desired information without unlocking or otherwise physically manipulating the electronic device.

While such a system is far more convenient than, for example, unlocking the device, launching a web browser application, navigating to a search engine, typing the question into the search engine window, and waiting for a response, embodiments of the disclosure contemplate that users would prefer a system that allowed voice control without having to first state a trigger phrase. In an ideal world, an electronic device would understand whenever its owner is asking for something with no trigger required to provide a more natural, humanistic experience.

Embodiments of the disclosure provide an electronic device that comes closer to this ideal than do prior art devices. In one or more embodiments, an electronic device includes one or more physical and/or environmental sensors that can operate in various sensing modes, e.g., mechanically, electrically, acoustically, and visually, to detect a predefined operating condition of the electronic device. Illustrating by example, in one embodiment one or more processors are operable with an audio capture device. In one embodiment, the audio capture device, one example of which is a microphone, is in an "always ON" state. As such, the audio capture device is able to capture audio input. The one or more processors, which can include a digital signal processor, can then identify whether one or more device commands are present in the audio input.

In a first mode of operation, the one or more processors are configured to execute a control operation in response to device commands preceded by a trigger phrase identified in the audio input received by the audio capture device. However, in one or more embodiments the one or more processors are configured to transition from the first mode of operation to a second mode of operation in response to detecting a predefined operating condition of the electronic device. In the second mode of operation, the one or more processors execute the control operation without requiring the trigger phrase to precede the device command. In short, when a predefined operating condition of the electronic device is detected, the one or more processors "bypass" the trigger phrase requirement and execute control operations in response to only the device commands.

Examples of these predefined operating conditions include when the electronic device is near a user's head. In one or more embodiments, a predefined operating condition comprises an electronic device being within a predefined distance of user's head while no voice call is occurring. Another example of a predefined condition occurs when the distance between the audio capture device and a user's mouth is less than a predefined threshold. Another example of a predefined condition is when the distance between the audio capture device and a user's mouth is less than a predefined threshold and the user's voice is directed toward the audio capture device, as determined by beam steering or other techniques. In still another embodiment where the electronic device includes a hinge between a first device housing and a second device housing, a predefined condition can occur when the first device housing is pivoted about the hinge to an axially displaced open position. These examples of predefined conditions are illustrative only. Numerous others will be obvious to those of ordinary skill in the art having the benefit of this disclosure.

In one or more embodiments, one or more sensors of an electronic device detect the proximity of a user's mouth for the purpose of determining whether the voice assistant feature of the electronic device is being addressed by the user to transition the electronic device from the first mode of operation to the second mode of operation to bypass the trigger phrase. In one or more embodiments, where the electronic device includes a hinge between a first device housing and a second device housing, when no incoming call is occurring, the action of transitioning the first device housing and the second device housing from the closed position to the axially displaced open position activates the voice assistant feature for a predefined time. In one or more embodiments, during this predefined time the one or more processors of the electronic device will execute control operations in response to device commands without requiring any trigger phrase to precede the device command.

In still another embodiment, if no incoming call is occurring at the electronic device, if a user's ear is detected close to the earpiece speaker, or alternatively if the user's mouth is detected close to the microphone, the one or more processors of the electronic device will execute control operations in response to device commands without requiring any trigger phrase to precede the device command. Electronic devices can be configured to detect whether the ear is close to the earpiece speaker using optical proximity sensors, thermal sensors, capacitive proximity sensors, pressure sensors, ultrasonic proximity sensors, radar sensors, or other sensors. Additionally, the orientation of the electronic device in three-dimensional space, e.g., whether the tilt of the electronic device indicates that the electronic device is near the ear, can be used to confirm—or alternatively detect—whether the ear is close to the earpiece speaker. Other techniques for determining whether the ear is close to the earpiece speaker will be obvious to those of ordinary skill in the art having the benefit of this disclosure.

Electronic devices can be configured to detect whether the mouth is close to the microphone using beam steering to determine mouth position, using a touch sensitive display to determine whether a person's cheek touches or hovers over the display, or by using an of a volatile organic compound sensor, carbon dioxide sensor, or humidity sensor to detect a person's breath at the microphone location. Other techniques for determining whether the mouth is close to the microphone will be obvious to those of ordinary skill in the art having the benefit of this disclosure.

In one or more embodiments, the one or more processors can additionally determine the identity of the user to confirm that the user is in fact intending to ask something of the electronic device. For example, a voice interface engine can determine the identity of the user by matching a voiceprint to stored indicia corresponding to the user in memory. If the person asking a question is the owner of an electronic device, it is more likely that the question is intended for the electronic device than if asked by a stranger.

In one or more embodiments, the one or more processors of an electronic device execute control operations without requiring a trigger phrase to precede device commands when an authorized user of the electronic device is recognized via voice recognition, and when the source of the identified voice is detected as being near the microphone by measuring loudness of the voice relative to echoes of the voice, and when the source of the identified voice is detected as being directed at the microphone by one or more beam steering microphones. In such a situation, the one or more processors can execute a control operation in response to the device command extracted from the audio input. Said differently, in one embodiment the one or more processors can process the buffered audio signal, perform speech-to-text conversion, and parse the words to determine if any meaningful device commands were uttered indicating that a control operation should be performed.

If a device command is found, in one embodiment the one or more processors can optionally prompt the user and ask for confirmation. Illustrating by example, if the user said, "Please call my wife" while an electronic device having a first device housing separated from a second device housing by hinge was not receiving a voice call and when the first device housing was pivoted about the hinge relative to the second device housing from a closed position to an axially displaced open position, the one or more processors may deliver, with an output device such as a loudspeaker, an output to confirm the device command. In this example, the one or more processors may cause the loudspeaker to emit a voice stating, "Would you like me to call your wife?" In one or more embodiments, when this occurs the user can respond, for instance by stating, "yes." The one or more processors receive this confirmation with the audio capture device. Accordingly, the one or more processors can execute the control operation, here making a telephone call to the user's wife, in response to the device command and without requiring a trigger phrase to precede the device command. One advantage of using the optional confirmation step is that if the command was parsed in error, the user may simply say "no." When this occurs iteratively, the one or more processors can use this feedback to learn and improve accuracy.

In one or more embodiments, a method in an electronic device comprises identifying, with one or more sensors of the electronic device, a predefined operating condition. In one or more embodiments, one or more processors operable with the one or more sensors transition from a first mode of operation, where the one or more processors execute control operation sin response to device commands identified in audio input received by an audio capture device only when the device commands are preceded by a trigger phrase identified in the audio input, to a second mode of operation where the one or more processors execute the control operations without requiring the trigger phrase when the device commands are received while the electronic device is in the predefined operating condition. Using this method, a user of the electronic device can bypass the trigger phrase when addressing the voice assistant feature of the electronic device.

Turning now to FIG. 1, illustrated therein are two explanatory electronic devices 101,102, each configured in accordance with one or more embodiments of the disclosure. Each electronic device 101,102 of FIG. 1 is configured as a portable electronic device. For illustrative purposes, each electronic device 101,102 is shown as a smartphone. However, the electronic devices 101,102 could be any number of other devices as well, including tablet computers, gaming devices, multimedia players, and so forth. Still other types of electronic devices can be configured in accordance with one or more embodiments of the disclosure as will be readily appreciated by those of ordinary skill in the art having the benefit of this disclosure.

Electronic device 101 is configured as a "candy bar" device in which the device housing 103 is not deformable and includes no hinges or other deformable components. By contrast, electronic device 102 is configured as a "flip" device that includes a first device housing 104 and a second device housing 105. In one or more embodiments, a hinge 106 couples the first device housing 104 to the second device housing 105.

Thus, while the display 107 of electronic device 101 is always exposed and accessible, in electronic device 102 the first device housing 104 is selectively pivotable about the hinge 106 relative to the second device housing 105 to selectively conceal, and reveal, the primary display 108. (As will be shown in FIG. 2, the electronic device 102 can optionally include secondary displays that are exposed when the first device housing 104 is pivoted about the hinge 106 relative to the second device housing 105 to a closed position.) In one or more embodiments, the first device housing 104 of electronic device 102 is selectively pivotable about the hinge 106 between a closed position and an axially displaced open position, each of which is shown and described below with reference to FIG. 2.

In one or more embodiments the device housing 103 of electronic device 101 and/or the first device housing 104 and the second device housing 105 of electronic device 102 are manufactured from a rigid materials such as a rigid thermoplastic, metal, or composite material, although other materials can be used. Still other constructs will be obvious to those of ordinary skill in the art having the benefit of this disclosure. In the illustrative embodiment of FIG. 1, electronic device 102 includes only a single hinge 106. However, in other embodiments two or more hinges can be incorporated into the electronic device 102 to allow it to be folded in multiple locations.

Moreover, while electronic device 102 includes a hinge 106, embodiments of the disclosure are not so limited. In other embodiments, the electronic device 102 will be bendable, but will not include a hinge 106, such as when the first device housing 104 and the second device housing 105 are manufactured from bendable materials. In still other embodiments, the electronic device 102 can be bendable via a combination of hinge components and non-hinge components.

Illustrating by example, in another embodiment electronic device 102 can include a single housing, like electronic device 101, but that is flexible rather than being rigid. In one embodiment, the housing may be manufactured from a malleable, bendable, or physically deformable material such as a flexible thermoplastic, flexible composite material, flexible fiber material, flexible metal, organic or inorganic textile or polymer material, or other materials. The housing could be formed from a single flexible housing member or from multiple flexible housing members.

In other embodiments, the housing could be a composite of multiple components. For instance, in another embodiment the housing could be a combination of rigid segments connected by hinges or flexible materials. Still other constructs will be obvious to those of ordinary skill in the art having the benefit of this disclosure.

While electronic device 101 and electronic device 102 are illustrated as being hand-held devices, they could also be configured as a wearable device. Illustrating by example, electronic devices configured in accordance with embodiments of the disclosure can include a housing and one or more straps that allow the electronic device to be worn around a wrist as a watch or folded over and clipped to a garment. Other types of wearable electronic devices and/or other mechanical configurations of wearable electronic devices will be obvious to those of ordinary skill in the art having the benefit of this disclosure.

Also illustrated in FIG. 1 is one explanatory block diagram schematic 109 of one or more components suitable for inclusion with either electronic device 101 or electronic device 102. In one or more embodiments, the block diagram schematic 109 is configured as a printed circuit board assembly disposed within the device housing 103 of electronic device 101 or the first device housing 104 and/or second device housing 105 of electronic device 102. Various components can be electrically coupled together by conductors or a bus disposed along one or more printed circuit boards. It should be noted that the block diagram schematic 109 includes many components that are optional, but which are included in an effort to demonstrate how varied electronic devices configured in accordance with embodiments of the disclosure can be.

Illustrating by example, in one or more embodiments the electronic device 101,102 includes an audio input device 110 to receive audio input and an audio output device 111 to deliver audio output. Where the electronic device 101,102 is configured to be purely a voice assistant device, a display 107,108 would be optional, in that it is not required for this voice-based user interaction convention.

Thus, it is to be understood that the block diagram schematic 109 of FIG. 1 is provided for illustrative purposes only and for illustrating components of one electronic device 101,102 in accordance with embodiments of the disclosure. The block diagram schematic 109 of FIG. 1 is not intended to be a complete schematic diagram of the various components required for an electronic device 101,102. Therefore, other electronic devices in accordance with embodiments of the disclosure may include various other components not shown in FIG. 1, or may include a combination of two or more components or a division of a particular component into two or more separate components, and still be within the scope of the present disclosure.

The illustrative block diagram schematic 109 of FIG. 1 includes many different components. Embodiments of the disclosure contemplate that the number and arrangement of such components can change depending on the particular application. For example, a wearable electronic device may have fewer, or different, components from a non-wearable electronic device. Similarly, an electronic device configured as a dedicated voice assistant may have fewer, or different, components from a smartphone, and so forth. Accordingly, electronic devices configured in accordance with embodiments of the disclosure can include some components that are not shown in FIG. 1, and other components that are shown may not be needed and can therefore be omitted.

The illustrative block diagram schematic 109 includes a user interface 112. In one or more embodiments, the user interface 112 includes a display 107,108, which may optionally be touch-sensitive. In one embodiment, users can deliver user input to the display 107,108 of such an embodiment by delivering touch input from a finger, stylus, or other objects disposed proximately with the display 107,108. For electronic device 102, since the display 108 spans the hinge 106, it is configured to be flexible. For instance, in one embodiment this display 108 is configured as an organic light emitting diode (OLED) display fabricated on a flexible plastic substrate. This allows the display 108 to be flexible so as to deform when the first device housing 104 pivots about the hinge 106 relative to the second device housing 105. However, it should be noted that other types of displays would be obvious to those of ordinary skill in the art having the benefit of this disclosure. In other embodiments conventional, rigid displays can be disposed to either side of the hinge 106 rather than using a flexible display.

In one embodiment, the display 107 is configured as an active matrix organic light emitting diode (AMOLED) display. However, it should be noted that other types of displays, including liquid crystal displays, would be obvious to those of ordinary skill in the art having the benefit of this disclosure.

In one embodiment, the electronic device 101,102 includes one or more processors 113. In one embodiment, the one or more processors 113 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the block diagram schematic 109. Each of the application processor and the auxiliary processor(s) can be configured to process and execute executable software code to perform the various functions of the electronic device 101,102 with which the block diagram schematic 109 operates. A storage device, such as memory 114, can optionally store the executable software code used by the one or more processors 113 during operation.

The one or more processors 113 can optionally include, and be operable with, a timer 131. For example, in one or more embodiments where the electronic device 102 is configured as a foldable electronic device, when a user pivots the first device housing 104 about the hinge 106 relative to the second device housing 105 from a closed position to an axially displaced open position, the one or more processors 113 can initiate and/or actuate the timer 131. The use of the timer 131 can be used in association with a second mode of operation in which control operations are executed in response to device commands without requiring a trigger phrase, with the one or more processors 113 transitioning back to the first mode of operation upon expiration of the timer 131.

In this illustrative embodiment, the block diagram schematic 109 also includes a communication circuit 115 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks.

The communication circuit 115 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The communication circuit 115 can include wireless communication circuitry, one of a receiver, a transmitter, or transceiver, and one or more antennas.

In one embodiment, the one or more processors 113 can be responsible for performing the primary functions of the electronic device with which the block diagram schematic 109 is operational. For example, in one embodiment the one or more processors 113 comprise one or more circuits operable with the user interface 112 to present presentation information to a user. Additionally, the one or more processors 113 can be operable with an audio output device 111 to deliver audio output to a user. The executable software code used by the one or more processors 113 can be configured as one or more modules 116 that are operable with the one or more processors 113. Such modules 116 can store instructions, control algorithms, and so forth.

In one or more embodiments, the block diagram schematic 109 includes an audio input/processor 117. The audio input/processor 117 can include hardware, executable code, and speech monitor executable code in one embodiment. The audio input/processor 117 can include, stored in memory 114, basic speech models, trained speech models, or other modules that are used by the audio input/processor 117 to receive and identify voice commands that are received with audio input captured by an audio input device 110. In one embodiment, the audio input/processor 117 can include a voice recognition engine. Regardless of the specific implementation utilized in the various embodiments, the audio input/processor 117 can access various speech models to identify speech commands in one or more embodiments.

The audio input/processor 117 is operable as an audio capture device to receive and capture audio input from a source, such as a person, authorized user, plurality of persons within an environment 118 about the electronic device 101,102. The audio input/processor 117 can include hardware, executable code, and speech monitor executable code in one embodiment. The audio input/processor 117 can be operable with one or more predefined authentication references 119 stored in memory 114.

With reference to audio input, the predefined authentication references 119 can comprise representations of basic speech models, representations of trained speech models, or other representations of predefined audio sequences that are used by the audio input/processor 117 to receive and identify voice commands that are received with audio input captured by an audio input device 110. In one embodiment, the audio input/processor 117 can include a voice recognition engine. Regardless of the specific implementation utilized in the various embodiments, the audio input/processor 117 can access various speech models stored with the predefined authentication references 119 to identify speech commands.

The audio input/processor 117 can include a beam steering engine 120. The beam steering engine 120 can be operable with one or both of an audio input device 110, such as one or more microphones, and/or an audio output device 111, such as one or more loudspeakers. When functioning with the audio input device 110, the beam steering engine 120 can process audio input from, for example, one or more microphones defining a virtual microphone. This virtual microphone can define an acoustic reception cone that can be virtually "steered" around the electronic device 101,102.

Alternatively, actual steering can occur as well, such as switching between a left microphone and right microphone or a front and back microphone. In still other embodiments, beam steering can be performed by processing relative amplitudes and/or time delays of signals received by two or more microphones situated at different locations along the device housing to determine the direction of the sound source. Similar analysis can be used to filter out signals received from unwanted directions, thereby creating a composite "steerable" audio input that can be focused in a desired direction. In one or more embodiments, two or more microphones can be included for selective beam steering by the beam steering engine 120.

Illustrating by example, a first microphone can be located on a first side of the electronic device 101,102 for receiving audio input from a first direction, while a second microphone can be placed on a second side of the electronic device 101,102 for receiving audio input from a second direction. These microphones can be "steered" by selectively turning them ON and OFF.

The beam steering engine 120 can then select between the first microphone and the second microphone to beam steer audio reception toward an object, such as a user delivering audio input. This beam steering can be responsive to input from other sensors 121, such as imagers, facial depth scanners, thermal sensors, or other sensors. For example, an imager can estimate a location of a person's face and deliver signals to the beam steering engine 120 alerting it in which direction to focus the acoustic reception cone and/or steer the first microphone and the second microphone, thereby adding confirmation to audio steering and saving time. Where multiple people are around the electronic device 101,102, this steering advantageously directs a beam reception cone toward a person who is speaking to determine whether the person is speaking in a direction aligned with the audio input device 110, which serves as an audio capture device.

Alternatively, the beam steering engine 120 can process and combine the signals from two or more microphones to perform beam steering. The one or more microphones can be used for voice commands. In response to control of the one or more microphones by the beam steering engine 120, a user location direction can be determined. The beam steering engine 120 can then select between the first microphone and the second microphone to beam steer audio reception toward the user. Alternatively, the audio input/processor 117 can employ a weighted combination of the microphones to beam steer audio reception toward the user.

When functioning with the audio output device 111, the beam steering engine 120 can deliver audio output to, for example, one or more loudspeakers such that the one or more loudspeakers define a directional loudspeaker. Illustrating by example, mechanically adjustable waveguides or horns could be operable with the one or more loudspeakers to selectively aim output acoustic signals in a particular direction. In other embodiments, signal processing of acoustic signals delivered to the one or more loudspeakers can adjust the phase and magnitude of acoustic waves emitted by the one or more loudspeakers, thereby creating overlapping and non-overlapping patterns of sound that cause a change in direction. Other techniques for steering output sound will be obvious to those of ordinary skill in the art having the benefit of this disclosure.

In one embodiment, the audio input/processor 117 is configured to implement a voice control feature that allows the electronic device 101,102 to function as a voice assistant device, which may be configured as a voice assistant engine 136. In one or more embodiments, the voice assistant engine 136 is a digital assistant using voice recognition, speech synthesis, and natural language processing to receive audio input comprising a voice command from a source, determine the appropriate response to the voice command, and then deliver the response in the form of audio output in response to receiving the audio input from the source. When so configured, a user can cause the emanation of the audio input from their mouth to cause the one or more processors 113 of the electronic device 101,102 to execute a control operation.

Various sensors 121 can be operable with the one or more processors 113. A first example of a sensor that can be included with the various sensors 121 is a touch sensor. The touch sensor can include a capacitive touch sensor, an infrared touch sensor, resistive touch sensors, or another touch-sensitive technology.

Another example of a sensor 121 is a geo-locator that serves as a location detector 123. In one embodiment, location detector 123 is able to determine location data of the electronic device 101,102. Location can be determined by capturing the location data from a constellation of one or more earth orbiting satellites, or from a network of terrestrial base stations to determine an approximate location. The location detector 123 may also be able to determine location by locating or triangulating terrestrial base stations of a traditional cellular network, such as a CDMA network or GSM network, or from other local area networks, such as Wi-Fi networks.

One or more motion detectors can be configured as an orientation detector 124 that determines an orientation and/ or movement of the electronic device 101,102 in three-dimensional space. Illustrating by example, the orientation detector 124 can include an accelerometer, gyroscopes, or other device to detect device orientation and/or motion of the electronic device 101,102. Using an accelerometer as an example, an accelerometer can be included to detect motion of the electronic device. Additionally, the accelerometer can be used to sense some of the gestures of the user, such as one talking with their hands, running, or walking.

The orientation detector 124 can determine the spatial orientation of an electronic device 101,102 in three-dimensional space by, for example, detecting a gravitational direction. In addition to, or instead of, an accelerometer, an electronic compass can be included to detect the spatial orientation of the electronic device relative to the earth's magnetic field. Similarly, one or more gyroscopes can be included to detect rotational orientation of the electronic device 101,102.

Another example of a sensor 121 is the motion detector. Illustrating by example, an accelerometer, gyroscopes, or other device can be used as a motion detector in an electronic device. Using an accelerometer as an example, an accelerometer can be included to detect motion of the electronic device. Additionally, the accelerometer can be used to sense some of the gestures of the user, such as one talking with their hands, running, or walking.

The motion detector can also be used to determine the spatial orientation of an electronic device as well in three-dimensional space by detecting a gravitational direction. In addition to, or instead of, an accelerometer, an electronic compass can be included to detect the spatial orientation of the electronic device relative to the earth's magnetic field. Similarly, one or more gyroscopes can be included to detect rotational motion of the electronic device.

Another example of a sensor 121 is a force sensor. Where included, the force sensor can take various forms. For example, in one embodiment, the force sensor comprises resistive switches or a force switch array configured to detect contact with either the display or the housing of an electronic device. The array of resistive switches can function as a force-sensing layer, in that when contact is made with either the surface of the display or the housing of the electronic device, changes in impedance of any of the switches may be detected. The array of switches may be any of resistance sensing switches, membrane switches, force-sensing switches such as piezoelectric switches, or other equivalent types of technology. In another embodiment, the force sensor can be capacitive. In yet another embodiment, piezoelectric sensors can be configured to sense force as well. For example, where coupled with the lens of the display, the piezoelectric sensors can be configured to detect an amount of displacement of the lens to determine force. The piezoelectric sensors can also be configured to determine force of contact against the housing of the electronic device 101,102 rather than the display 107,108.

An imager processor system 125 can be included in the electronic device 101,102 and can be operable with the one or more processors 113. The imager processor system can include one or more sensors 121. For example, in one or more embodiments the one or more sensors 121 included with the imager processor system 125 comprise one or more of an imager 122, a depth imager 126, and, optionally, one or more proximity sensors 127.

In one embodiment, the imager 122 comprises a two-dimensional imager configured to receive at least one image of a person within an environment of the electronic device 101,102. In one embodiment, the imager 122 comprises a two-dimensional Red-Green-Blue (RGB) imager. In another embodiment, the imager 122 comprises an infrared imager. Other types of imagers suitable for use as the imager 122 of electronic device 101,102 will be obvious to those of ordinary skill in the art having the benefit of this disclosure.

The one or more proximity sensors 127 can take various forms. In one or more embodiments, the one or more proximity sensors 127 fall in to one of two camps: active proximity sensors and "passive" proximity sensors. Either the proximity detector components or the proximity sensor components can be generally used for distance determination, changes in distance between a source, e.g., a user of the electronic device, and the electronic device 101,102, a source output of the source, e.g., the mouth of a user of the electronic device, and the electronic device 101,102, a source input of the source, e.g., an ear of a user of the electronic device, and the electronic device 101,102, other physical features of a source and the electronic device 101,102, and other user interface protocols, some examples of which will be described in more detail below.

As used herein, a "proximity sensor component" comprises a signal receiver only that does not include a corresponding transmitter to emit signals for reflection off an object to the signal receiver. A signal receiver only can be used due to the fact that a user's body or other heat generating object external to the electronic device 101,102 serves as the transmitter. Illustrating by example, in one embodiment the proximity sensor components comprise a signal receiver to receive signals from objects external to the housing(s) of the electronic device 101,102.

In one embodiment, the signal receiver is an infrared signal receiver to receive an infrared emission from a source, such as a human being, when the human being is approaching the electronic device 101,102. In one or more embodiments, the proximity sensor component is configured to receive infrared wavelengths of about four to about ten micrometers. This wavelength range is advantageous in one or more embodiments in that it corresponds to the wavelength of heat emitted by the body of a human being.

Additionally, detection of wavelengths in this range is possible from farther distances than, for example, would be the detection of reflected signals from the transmitter of a proximity detector component. In one embodiment, the proximity sensor components have a relatively long detection range so as to detect heat emanating from a person's body when that person is within a predefined thermal reception radius. For example, the proximity sensor component may be able to detect a person's body heat from a distance of about fifteen feet in one or more embodiments. The ten-foot dimension can be extended as a function of designed optics, sensor active area, gain, lensing gain, and so forth.

Proximity sensor components are sometimes referred to as a "passive IR detectors" due to the fact that the person is the active transmitter. Accordingly, the proximity sensor component requires no transmitter since objects disposed external to the housing deliver emissions that are received by the infrared receiver. As no transmitter is required, each proximity sensor component can operate at a very low power level. Simulations show that a group of infrared signal receivers can operate with a total current drain of just a few microamps.

In one embodiment, the signal receiver of each proximity sensor component can operate at various sensitivity levels so as to cause the at least one proximity sensor component to be operable to receive the infrared emissions from different distances. For example, the one or more processors 113 can cause each proximity sensor component to operate at a first "effective" sensitivity so as to receive infrared emissions from a first distance. Similarly, the one or more processors 113 can cause each proximity sensor component to operate at a second sensitivity, which is less than the first sensitivity, so as to receive infrared emissions from a second distance, which is less than the first distance. The sensitivity change can be effected by causing the one or more processors 113 to interpret readings from the proximity sensor component differently.

By contrast, proximity detector components include a signal emitter and a corresponding signal receiver, which constitute an "active IR" pair. While each proximity detector component can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components comprise infrared transmitters and receivers. The infrared transmitters are configured, in one embodiment, to transmit infrared signals having wavelengths of about 860 nanometers, which is one to two orders of magnitude shorter than the wavelengths received by the proximity sensor components. The proximity detector components can have signal receivers that receive similar wavelengths, i.e., about 860 nanometers.

In one or more embodiments, each proximity detector component can be an infrared proximity sensor set that uses a signal emitter that transmits a beam of infrared light that reflects from a nearby object and is received by a corresponding signal receiver. Proximity detector components can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals.

In one embodiment, the one or more proximity sensors 127 simply comprise a proximity sensor component. In another embodiment, the one or more proximity sensors 127 comprise a simple thermopile. In another embodiment, the one or more proximity sensors 127 comprise an infrared imager that captures the amount of thermal energy emitted by an object. In still other embodiments, the one or more proximity sensors 127 comprise a proximity detector component. Of course, combinations of these components can be used as the one or more proximity sensors 127. Moreover, other types of proximity sensors suitable for use with the electronic device 101,102 will be obvious to those of ordinary skill in the art having the benefit of this disclosure.

As with the one or more proximity sensors 127, the depth imager 126 can take a variety of forms. In a first embodiment, the depth imager 126 comprises a pair of imagers separated by a predetermined distance, such as three to four images. This "stereo" imager works in the same way the human eyes do in that it captures images from two different angles and reconciles the two to determine distance.

In another embodiment, the depth imager 126 employs a structured light laser. The structured light laser projects tiny light patterns that expand with distance. These patterns land on a surface, such as a user's face, and are then captured by an imager. By determining the location and spacing between the elements of the pattern, three-dimensional mapping can be obtained.

In still another embodiment, the depth imager 126 comprises a time of flight device. Time of flight three-dimensional sensors emit laser or infrared pulses from a photodiode array. These pulses reflect back from a surface, such as the user's face. The time it takes for pulses to move from the photodiode array to the surface and back determines distance, from which a three-dimensional mapping of a surface can be obtained. Regardless of embodiment, the depth imager 126 adds a third "z-dimension" to the x-dimension and y-dimension defining the two-dimensional image captured by the imager 122, thereby enhancing the security of using a person's face as their password in the process of authentication by facial recognition.

In one or more embodiments, the imager processor system 125 can be operable with a face analyzer 128 and an environmental analyzer 129. The face analyzer 128 and/or environmental analyzer 129 can be configured to process an image or depth scan of an object and determine whether the object matches predetermined criteria by comparing the image or depth scan to one or more predefined authentication references 119 stored in memory 114.

For example, the face analyzer 128 and/or environmental analyzer 129 can operate as an authentication module configured with optical and/or spatial recognition to identify objects using image recognition, character recognition, visible recognition, facial recognition, color recognition, shape recognition, and the like. Advantageously, the face analyzer 128 and/or environmental analyzer 129, operating in tandem with the imager processor system 125, can be used as a facial recognition device to determine the identity of one or more persons detected within an environment about the electronic device 101,102.

In one embodiment when the imager processor system 125 detects a person, one or both of the imager 122 and/or the depth imager 126 can capture a photograph and/or depth scan of that person. The imager processor system 125 can then compare the image and/or depth scan to one or more predefined authentication references 119 stored in the memory 114. This comparison, in one or more embodiments, is used to confirm beyond a threshold authenticity probability that the person's face—both in the image and the depth scan—sufficiently matches one or more of the predefined authentication references 119 stored in the memory 114 to authenticate a person as an authorized user of the electronic device 101,102.

Beneficially, this optical recognition performed by the imager processor system 125 operating in conjunction with the face analyzer 128 and/or environmental analyzer 129 allows access to the electronic device 101,102 only when one of the persons detected about the electronic device 101,102 are sufficiently identified as an authorized user of the electronic device 101,102. Accordingly, in one or more embodiments the one or more processors 113, working with the imager processor system 125 and the face analyzer 128 and/or environmental analyzer 129 can determine whether at least one image captured by the imager 122 matches a first predefined criterion, and whether at least one facial depth scan captured by the depth imager 126 matches a second predefined criterion. The first criterion may be a skin color, eye color, and hair color, while the second criterion is a predefined facial shape, ear size, and nose size, and so forth. In one or more embodiments, the one or more processors 113 authenticate a person as an authorized user of the electronic device 101,102 when the at least one image matches the first predefined criterion and the at least one facial depth scan matches the second predefined criterion.

A gaze detector 130 can be operable with the imager processor system 125 operating in conjunction with the face analyzer 128. The gaze detector 130 can comprise sensors for detecting the user's gaze point. The gaze detector 130 can optionally include sensors for detecting the alignment of a user's head in three-dimensional space. Electronic signals can then be processed for computing the direction of user's gaze in three-dimensional space. The gaze detector 130 can further be configured to detect a gaze cone corresponding to the detected gaze direction, which is a field of view within which the user may easily see without diverting their eyes or head from the detected gaze direction. The gaze detector 130 can be configured to alternately estimate gaze direction by inputting images representing a photograph of a selected area near or around the eyes. It will be clear to those of ordinary skill in the art having the benefit of this disclosure that these techniques are explanatory only, as other modes of detecting gaze direction can be substituted in the gaze detector 130 of FIG. 1.

The face analyzer 128 can include its own image/gaze detection-processing engine as well. The image/gaze detection-processing engine can process information to detect a user's gaze point. The image/gaze detection-processing engine can optionally also work with the depth scans to detect an alignment of a user's head in three-dimensional space. Electronic signals can then be delivered from the imager 122 or the depth imager 126 for computing the direction of user's gaze in three-dimensional space. The signals can be used to detect a gaze cone corresponding to the detected gaze direction, which is a field of view within which the user may easily see without diverting their eyes or head from the detected gaze direction. Gaze can alternatively be estimated by inputting images representing a photograph of a selected area near or around the eyes. It can also be valuable to determine if the user wants to be authenticated by looking directly at device. The image/gaze detection-processing engine can determine not only a gazing cone but also if an eye is looking in a particular direction to confirm user intent to be authenticated.

In one embodiment where the electronic device 102 is configured as a foldable electronic device, the electronic device 102 includes one or more flex sensors 132. In one or more embodiments, the one or more flex sensors 132 are operable with the one or more processors 113. In one or more embodiments, the one or more flex sensors 132 detect a bending operation that causes the first device housing 104 to pivot about the hinge 106 relative to the second device housing 105, thereby transforming the electronic device 102 into a deformed geometry. The inclusion of flex sensors 132 is optional, and in some embodiments flex sensors 132 will not be included.

The flex sensors 132 can be configured in a variety of ways. In some embodiments, the flex sensors 132 detect a bending operation directly. For example, in one embodiment, the flex sensors 132 comprise passive resistive devices manufactured from a material with an impedance that changes when the material is bent, deformed, or flexed. By detecting changes in the impedance as a function of resistance, the one or more processors 113 can use the one or more flex sensors 132 to detect bending of the first device housing 104 about the hinge 106 relative to the second device housing 105. In one or more embodiments, each flex sensor 132 comprises a bi-directional flex sensor that can detect flexing or bending in two directions. In one embodiment, the one or more flex sensors 132 have an impedance that increases in an amount that is proportional with the amount it is deformed or bent.

In other embodiments, the flex sensors 132 detect a bending operation indirectly. Illustrating by example, in another embodiment the flex sensors 132 detect the first device housing 104 pivoting about the hinge 106 relative to the second device housing 105 from the axially displaced open position to the closed position by detecting the inner surfaces of the first device housing 104 and the second device housing 105 abutting. For instance, a magnet can be placed in the first device housing 104, while a magnetic sensor is placed in the second device housing 105, or vice versa. The magnetic sensor could be Hall-effect sensor, a giant magnetoresistance effect sensor, a tunnel magnetoresistance effect sensor, an anisotropic magnetoresistive sensor, or other type of sensor.

In still other embodiments, the flex sensors 132 can comprise an inductive coil placed in the first device housing 104 and a piece of metal placed in the second device housing 105, or vice versa. When the metal is in close proximity to the coil, the flex sensors 132 detect the first device housing 104 and the second device housing 105 in a first position. By contrast, when the metal is farther away from the coil, the flex sensors 132 detect the first device housing 104 and the second device housing 105 being in a second position, and so forth.

In other embodiments, a motion sensor, such as an accelerometer or gyroscope, is positioned in one of the first device housing 104, with another being placed in the second device housing 105. The flex sensors 132 can then compare motion sensor readings from each sensor to track the relative movement and/or position of the first device housing 104 relative to the second device housing 105, as well as the first device housing 104 and the second device housing 105 relative to gravity. This data can be used to determine and or track the state and position of the first device housing 104 and the second device housing 105 as they pivot about the hinge, as well as their orientation with reference to a gravitational direction. Other configurations for the flex sensors 132 will be obvious to those of ordinary skill in the art having the benefit of this disclosure.

In one embodiment, the one or more processors 113 may generate commands or execute control operations based on information received from the various sensors, including the one or more flex sensors 132, the user interface 112, or the other sensors 121. Illustrating by example, in one or more embodiments the one or more processors 113 transition from the first mode of operation in which a trigger phrase is required to a second mode of operation where one is not when the one or more flex sensors 132 indicate that the first device housing 104 has pivoted about the hinge 106 relative to the second device housing 105 from the closed position to the axially displaced open position.

The one or more processors 113 may also generate commands or execute control operations based upon information received from a combination of the one or more flex sensors 132, the user interface 112, or the other sensors 121. Alternatively, the one or more processors 113 can generate commands or execute control operations based upon information received from the one or more flex sensors 132 or the user interface 112 alone. Moreover, the one or more processors 113 may process the received information alone or in combination with other data, such as the information stored in the memory 114.

Other components 133 operable with the one or more processors 113 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as the one or more loudspeakers, the ultrasound transducers (where included), or other alarms and/or buzzers. The other components 133 can also include a mechanical output component such as vibrating or motion-based mechanisms.

The other components 133 can optionally include a barometer operable to sense changes in air pressure due to elevation changes or differing pressures of the electronic device 101,102. Where included, in one embodiment the barometer includes a cantilevered mechanism made from a piezoelectric material and disposed within a chamber. The cantilevered mechanism functions as a pressure sensitive valve, bending as the pressure differential between the chamber and the environment changes. Deflection of the cantilever ceases when the pressure differential between the chamber and the environment is zero. As the cantilevered material is piezoelectric, deflection of the material can be measured with an electrical current.

The other components 133 can also optionally include a light sensor that detects changes in optical intensity, color, light, or shadow in the environment of an electronic device. This can be used to make inferences about context such as weather or colors, walls, fields, and so forth, or other cues. An infrared sensor can be used in conjunction with, or in place of, the light sensor. The infrared sensor can be configured to detect thermal emissions from an environment about the electronic device 101,102. Similarly, a temperature sensor can be configured to monitor temperature about an electronic device.

In one or more embodiments, the one or more processors 113 can define one or more process engines. Examples of these process engines include a context engine 134, a mouth and ear detection engine 135, and a voice assistant engine 136. Each engine can be a component of the one or more processors 113, operable with the one or more processors 113, defined by the one or more processors 113, and/or integrated into the one or more processors 113. Other configurations for these engines, including as software or firmware modules operable on the one or more processors 113, will be obvious to those of ordinary skill in the art having the benefit of this disclosure.

For instance, a context engine 134 can be operable with the various sensors to detect, infer, capture, and otherwise determine persons and actions that are occurring in an environment about the electronic device 101,102. For example, where included one embodiment of the context engine 134 determines assessed contexts and frameworks using adjustable algorithms of context assessment employing information, data, and events. These assessments may be learned through repetitive data analysis. Alternatively, a user may employ the user interface 112 to enter various parameters, constructs, rules, and/or paradigms that instruct or otherwise guide the context engine 134 in detecting multi-modal social cues, emotional states, moods, and other contextual information. The context engine 134 can comprise an artificial neural network or other similar technology in one or more embodiments.

In one or more embodiments, the context engine 134 is operable with the one or more processors 113. In some embodiments, the one or more processors 113 can control the context engine 134. In other embodiments, the context engine 134 can operate independently, delivering information gleaned from detecting multi-modal social cues, emotional states, moods, and other contextual information to the one or more processors 113. The context engine 134 can receive data from the various sensors. In one or more embodiments, the one or more processors 113 are configured to perform the operations of the context engine 134.

The mouth and ear detection engine 135 can be operable with, or integrated in, the one or more processors 113 to determine how closely an ear or mouth of a person is to the audio input device 110 or audio output device 111, respectively. For instance, in one embodiment the ear and mouth detection engine can estimate a sound pressure level of audio input received by the audio input device to determine how close a person's mouth is to the audio input device 110. Other techniques for estimating how closely the ear or mouth is to the electronic device 101,102 will be described below with reference to FIG. 3. Still other techniques will be obvious to those of ordinary skill in the art having the benefit of this disclosure. In addition to determining how close the mouth or ear is to the electronic device 101,102, in one or more embodiments the mouth and ear detection engine 135 can determine whether a person's voice is directed toward the electronic device 101,102, such as by employing the beam steering engine 120 as previously described.

In one or more embodiments, the one or more processors 113 can optionally determine, from signals from the one or more sensors 121, a distance between a source output of a source delivering audio input to the audio input device 110 and the audio input device 110 of the electronic device 101,102. Illustrating by example, proximity detector components included with the one or more proximity sensors 127 of the one or more sensors 121 can be used, for example, to compute the distance o any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals.

Alternatively, the depth imager 126 can take consecutive depth scans of an estimate the distance between the source and the audio input device 110 of the electronic device 101,102. Similarly, the imager 122 can capture successive images, with the one or more processors 113 performing image analysis on the one or more images to compare the same to identifiable objects, e.g., a car or truck, found in the images to determine the distance. Other techniques for determining the distance between the source and the electronic device 101,102 will be obvious to those of ordinary skill in the art having the benefit of this disclosure.

Recall from above that in one or more embodiments a beam steering engine 120 can determine a direction from which audio input is received. In one or more embodiments, the one or more processors 113 can use this information to determine whether to transition from the first mode of operation, where trigger phrases are employed to actuate the voice assistant engine 136, to a second mode of operation where the voice assistant engine 136 does not require trigger phrases for the one or more processors 113 to execute control operations in response to device commands in audio input received by the audio input device 110. If the audio input is directed at the audio input device 110, the one or more processors can conclude that the audio input is directed toward the audio input device 110, and can transition from the first mode of operation to the second mode of operation. By contrast, where received audio input is not directed toward the audio input device, in one or more embodiments the one or more processors 113 can simply ignore the audio input, even if perceived device commands are included therein.

In one or more embodiments, a combination of direction and distance can be used as inputs for the one or more processors 113 to determine whether to switch from the first mode of operation to the second mode of operation. Illustrating by example, when the distance between the source output of a source and the audio input device 110 of the electronic device 101,102 is determined to be less than a predefined threshold distance, the mouth and ear detection engine 135 also determines, from the one or more sensors 121, that the direction is directed toward the audio input device. Accordingly, the one or more processors 113 can transition from the first mode of operation to the second mode of operation where trigger words or phrases are not required.

Recall from above that by using the predefined authentication references 119, which can include basic speech models, representations of trained speech models, or other representations of predefined audio sequences, the audio input/processor 117 to receive and identify voice commands that are received with audio input captured by an audio input device 110 by functioning as a voice recognition engine. This feature can be used in one or more embodiments to provide a privacy function as well.

For example, in one or more embodiments the audio input/processor 117 receives, from the audio input device 110, audio input from a source. The audio input/processor 117 and/or one or more processors 113 can attempt to identify the source from the audio input. In this manner, the one or more processors 113 can determine whether the source is a known source, e.g., an authorized user of the electronic device 101,102. Whether the persons are known or unknown can serve as an input to the one or more processors 113 regarding whether to transition from the first mode of operation to the second mode of operation. For example, if the source is an authorized user of the electronic device 101,102, the one or more processors 113 may transition from the first mode of operation to the second mode of operation when the electronic device 101,102 is in a predefined operating condition. By contrast, where the source is unknown, the one or more processors 113 may remain in the first mode of operation regardless of operating condition or state.

In one or more embodiments, the voice assistant engine 136 is configured to implement a voice control feature that allows a user to speak a specific device command to cause the one or more processors 113 to execute a control operation. For example, the user may say, "How tall is the Willis Tower?" This question comprises a device command requesting the one or more processors 113 to retrieve, with the communication circuit 115, information from the Internet to answer the question. Consequently, this device command can cause the one or more processors 113 to access an application module, such as a web browser, to search for the answer and then deliver the answer as audible output via an audio output of the other components 133. In short, in one embodiment the voice assistant engine 136 listens for voice commands, processes the commands and, in conjunction with the one or more processors 113, returns an output that is the result of the user's intent.

Figure 2:
FIG. 2 illustrates one explanatory method in accordance with one or more embodiments of the disclosure.

Now that various hardware components have been described, attention will be turned to methods of using electronic devices in accordance with one or more embodiments of the disclosure. Turning now to FIG. 2, illustrated therein is one explanatory method 200 for the electronic devices (101,102) of FIG. 1. Alternate methods will be described thereafter with reference to subsequent figures.

Beginning at step 201, a user 210 holding the electronic device 102 of FIG. 1. As described above, the electronic device 102 is a foldable electronic device, with a first device housing 104 that is selectively pivotable about a hinge 106 relative to a second device housing (105). At step 301, the electronic device 102 is in the closed position where the inner surface of the first device housing 104 abuts the inner surface of the second device housing (105), thereby concealing the primary display (108). In this illustration, a second display 211 is disposed on the exterior side of the first device housing 104, and is therefore exposed and visible.

In one or more embodiments, the one or more processors (113) of the electronic device 102, optionally using the one or more flex sensors (132), detect that the electronic device 102 is in the closed position. In one or more embodiments, when the electronic device 102 is in this operating condition, the one or more processors (113) are configured to execute control operations in response to device commands only when those device commands are preceded by a trigger phrase identified in audio input received by an audio capture device, one example of which is the audio input/processor (117). In one or more embodiments, this mode of operating constitutes a first mode of operation for the one or more processors (113) and electronic device 102. In one or more embodiments, this first mode of operation is a default mode of operation for the one or more processors (113) and electronic device 102.

At step 202, the user 210 transitions the electronic device 102 from the closed position of step 201 to an axially disposed open position. Specifically, in this example the user 210 has pivoted the first device housing 104 relative to the second device housing 105 about the hinge 106 from the closed position of step 201 to the axially disposed open position of step 203. This exposes the display 108.

At step 203, the one or more processors (113), optionally in conjunction with the one or more flex sensors (132) detect that the electronic device 102 is now in the axially disposed open position. In one or more embodiments, the axially displaced open position constitutes a predefined operating condition of the electronic device 102 that causes a change in the mode of operation from the first mode of operation, or default mode of operation, to a second mode of operation. In one or more embodiments, when operating in the second mode of operation the one or more processors execute control operations without requiring any trigger phrase be present in the audio input received by the audio capture device. In short, when a predefined operating condition of the electronic device 102 is detected, the one or more processors (113) "bypass" the trigger phrase requirement and execute control operations in response to only the device commands.

In one or more embodiments, upon detecting this change, the one or more processors (113) transition from the first mode of operation to the second mode of operation at step 204. In one or more embodiments, the one or more processors (113) only transition from the first mode of operation to the second mode of operation when the electronic device 102 is in the axially displaced open position shown in step 202 and when no incoming call is occurring.

In one or more embodiments, the one or more processors (113) also launch or actuate the voice assistant engine (136) in the second mode of operation at step 204 in response to detecting the change from the closed position to the axially displaced open position. In one or more embodiments, the one or more processors (113) optionally also actuate a timer (131) at step 204 in response to detecting the change from the closed position to the axially displaced open position. In one or more embodiments, the one or more processors (113) transition from the second mode of operation to the first mode of operation upon expiration of the timer. Other actions that may occur at step 204 in response to detecting the change from the closed position to the axially displace open position will be obvious to those of ordinary skill in the art having the benefit of this disclosure.

At step 205, the user 210 delivers audio input 212 comprising a device command 213 to the electronic device 102 while the electronic device is in the predefined operating condition of this example, which is the axially displaced open position. In this example, the device command 213 is "Call Buster." However, as shown, the device command 213 is not preceded by any trigger phrase, such as "OK, Google, now . . . "

At step 206, an audio capture device, e.g., the audio input/processor (117) of the electronic device 102, operating in tandem with the audio input device (110), receives the audio input 212. In one or more embodiments, step 206 also comprising identifying, with one or more processors (113), the device command 213 from the audio input 212. In one or more embodiments, a device command 213 comprises a call to action. Illustrating by example, the question "How are you doing?" is not a device command because no action is requested. By contrast, the statement "Call Buster" can be a device command 213 because it includes a call to action, namely, that a person be contacted telephonically.

At optional decision 207, where a timer (131) was initiated at step 204, the one or more processors (113) can determine whether the timer (131) has expired. In one or more embodiments, where it has, or alternatively where the user 210 has transitioned the electronic device 102 from the axially displaced open position of step 202 back to the closed position of step 201, the method 200 moves to step 208. In one or more embodiments, the one or more processors (113) ignore the device command 213 at step 208 because it is not preceded by a trigger phrase. In one or more embodiments, step 208 comprises the one or more processors (113) from the second mode of operation back to the first mode of operation, where a trigger phrase is required to execute control operations in response to the device command 213, upon expiration of the timer.

In some embodiments, step 208 can comprise the one or more processors (113) causing an output device, such as the audio output device (111), to prompt the user 210 for the trigger phrase. For example, the one or more processors (113) might cause the audio output device (111) to say, "If you want me to call Buster, please indicate as much by using the appropriate trigger phrase before the device command," or something similar.

However, where the optional timer (131) has not expired, and/or where the electronic device 102 remains in the predefined condition when the audio input 212 is received, i.e., in the axially displaced open position in this example, the method 200 moves to step 209. In one or more embodiments, step 209 comprises the one or more processors (113) executing a control operation, e.g., causing the communication circuit (115) to make a telephonic voice call to Buster, without requiring the trigger phrase precede the device command 213.

In one or more embodiments, step 209 comprises the one or more processors (113) executing the control operation without requiring the trigger phrase precede the device command 2113 only when the device command 213 is received while the electronic device 102 is in the predefined operating condition. Said differently, in one or more embodiments step 209 comprises executing the control operation without requiring the trigger phrase precede the device command 2113 only when the electronic device 102 is in the axially displaced open position when the device command 213 is received. Thus, if the user 210 transitions the electronic device 102 from the axially displaced open position of step 202 back to the closed position of step 201 when delivering the audio input 212, in one or more embodiments the method 200 moves to step 208 rather than step 209.

In one or more embodiments, step 206 can comprise the one or more processors (113) attempting to determine the identity of the user 210 to confirm that the user 210 is in fact intending to ask something of the electronic device 102. Illustrating by example, in one or more embodiments the audio input/processor (117) uses the predefined authentication references (119) stored in the memory (114) of the electronic device 102, which can include basic speech models, representations of trained speech models, or other representations of predefined audio sequences, to attempt to identify audio input 212 and device commands 213 captured by the audio input device (110).

In this manner, the one or more processors (113) can determine whether the source is a known source, e.g., an authorized user of the electronic device 102. Whether the persons are known or unknown can serve as an input to the one or more processors (113) regarding whether to execute the control operation in response to the device command 213 without requiring the trigger phrase at step 209. For example, in one or more embodiments the one or more processors (113) execute the control operation in response to the device command 213 without requiring the trigger phrase at step 209 only when the source of the audio input 212 is an authorized user of the electronic device 102.

In one or more embodiments, step 209 only occurs when no incoming call is occurring when the audio input 212 is received at step 205. Said differently, in one or more embodiments where an incoming call is occurring when audio input 212 is received by the electronic device 102, the one or more processors (113) conclude that the audio input 212 is associated with the call, rather than including a device command 213. In such situations, the one or more processors (113) of the electronic device 102 will not execute control operations in response to device commands 213 without requiring any trigger phrase to precede the device command 213.

In one or more embodiments, step 209 optionally includes the one or more processors (113) prompting the user 210 to ask for confirmation. In this example, the device command 213 was "Call Buster." In one or more embodiments, step 209 can comprise the one or more processors (113) delivering, with the audio output device (111), audible output to confirm the device command 213. In this example, the one or more processors (113) may cause the audio output device (111) to emit a voice stating, "Would you like me to call Buster?" In one or more embodiments, when this occurs the user 210 can respond, for instance by stating, "yes." One advantage of using the optional confirmation step is that if the device command 213 was parsed in error, the user 210 may simply say "no." When this occurs iteratively, the one or more processors (113) can use this feedback to learn and improve accuracy.

Thus, as shown in FIG. 2, a method 200 in an electronic device 102 can comprise identifying, with one or more sensors (121) of the electronic device, such as the flex sensors (132) a predefined operating condition of the electronic device 102. In this illustrative embodiment, the predefined operating condition of the electronic device 102 comprises the first device housing 104 of the electronic device 102 pivoting about the hinge 106 relative to a second device housing 105 from the closed position of step 201 to the axially displaced open position of step 202.

In one or more embodiments, the method 200 comprises transitioning, at step 204, one or more processors (113) operable with the one or more sensors (121) from a first mode of operation, where the one or more processors (113) execute control operations in response to device commands 213 identified in audio input 212 received by an audio capture device only when the device commands 213 are preceded by a trigger phrase identified in the audio input 212, to a second mode of operation where the one or more processors (113) execute the control operations without requiring the trigger phrase when the device commands 213 are received while the electronic device 102 is in the predefined operating condition.

Other optional steps can be performed as well, such as initiating, by the one or more processors (113), a timer (131) in response to the one or more sensors (121) identifying commencement of the predefined operating condition at step 204. Similarly, the one or more processors can transition from the second mode of operation to the first mode of operation upon expiration of the timer at step 208. Identification of the source of the audio input 212, here the user 210, can also be used prior to executing the control operations without requiring the trigger phrase at step 209 as well.

Figure 3:
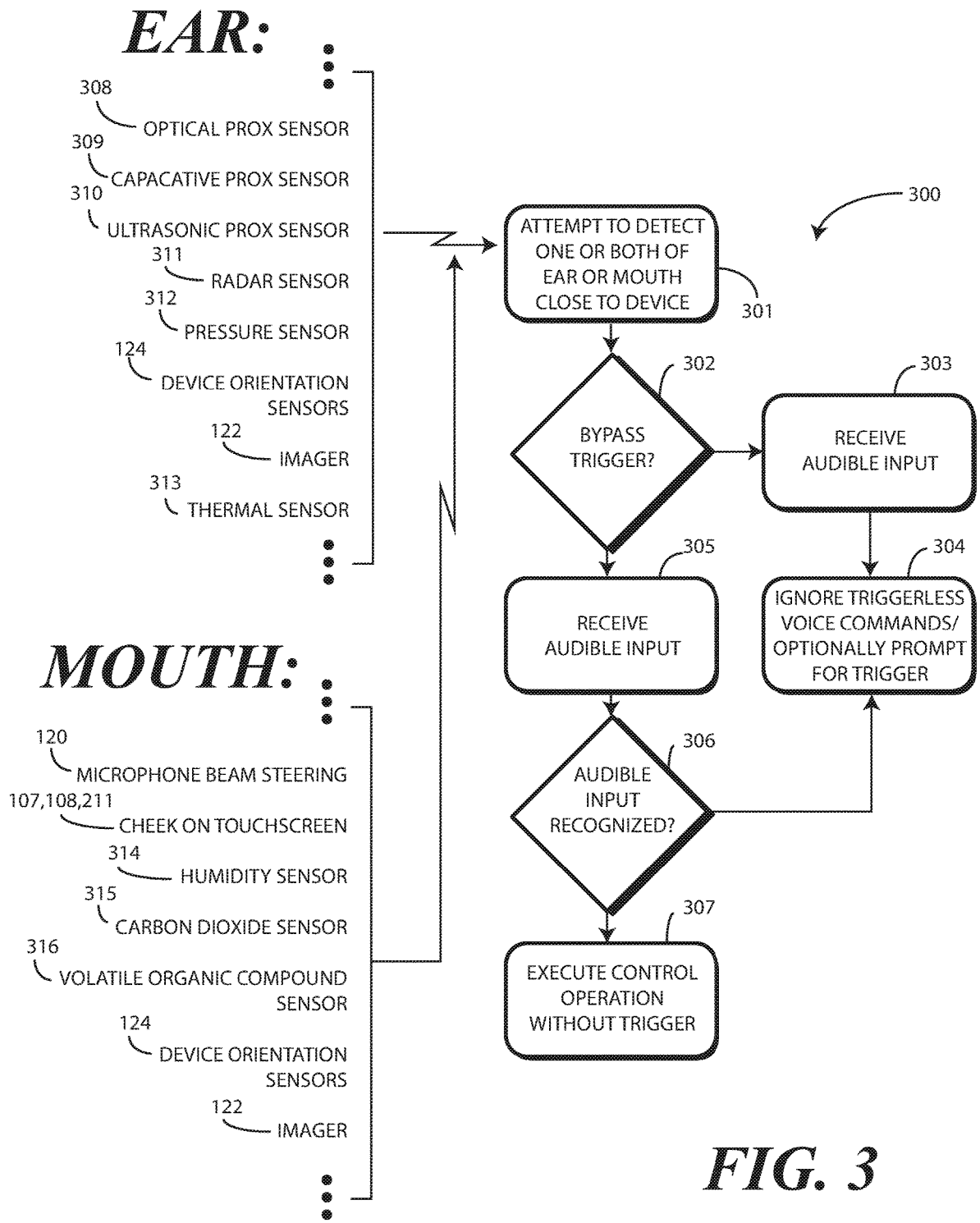
FIG. 3 illustrates another explanatory method, along with one or more explanatory environmental sensors, in accordance with one or more embodiments of the disclosure.

Turning now to FIG. 3, illustrated therein is an alternate method 300 of operating an electronic device in accordance with embodiments of the disclosure, be it electronic device (101) of FIG. 1, which is not deformable, or electronic device (102) of FIG. 1, which is foldable. The method 300 of FIG. 3 employs the mouth or ear detection engine (135) to detect the predefined operating condition of the electronic device (101,102), rather than detecting the physical configuration of the electronic device (102), as was the case in FIG. 2.

In the method 300 of FIG. 3, the predefined operating condition occurs when the electronic device (101,102) is near a user's head. Said differently, in the method of FIG. 3, the predefined operating condition occurs when the electronic device (101,102), or alternatively a component of the electronic device (101,102) such as the audio input device (110) or the audio output device (111), is within a predetermined distance of a user's head, or alternatively a portion of the user's head such as user's ear or the user's mouth. Where the user is a source of audio input being delivered to the electronic device (101,102), the user's ear is the source input of the source, while the user's mouth is a source output of the source.

In one or more embodiments, step 301 comprises the one or more sensors (121) of the electronic device (101,102) determining whether the electronic device (101,102), or alternatively a component of the electronic device (101,102) such as the audio input device (110) or the audio output device (111), is within a predefined distance of user's head, or alternatively a portion of the user's head such as user's ear or the user's mouth, while no voice call is occurring. This predefined condition can occur when the distance between the audio input device (110) of the electronic device (101, 102) and a user's mouth is less than a predefined distance threshold. This predefined condition can also occur when both the distance between the audio input device (110) and a user's mouth is less than a predefined distance threshold and the user's voice is directed toward the audio input device (110), as determined by beam steering engine (120), or by other techniques such as capturing an image of the source with an imager (122) to determine if the user's mouth is directed at the electronic device (101,102).

In one or more embodiments, one or more sensors (121) of the electronic device (101,102) detect the proximity of a user's mouth at step 301 for the purpose of determining whether the voice assistant engine (136) of the electronic device (101,102) is being addressed by the user to transition the electronic device (101,102) from the first mode of operation to the second mode of operation to bypass the trigger phrase. In other embodiments, if no incoming call is occurring at the electronic device (101,102), and if a user's ear is detected close, e.g., less than a predefined distance threshold such as three, four, five, or six inches, to the audio output device (111), or alternatively if the user's mouth is detected close, e.g., less than the predefined distance threshold, to the audio input device (110), the one or more processors of the electronic device (101,102) will transition from the first mode of operation to the second mode of operation as well.

Step 301 can also comprise determining a distance between a source input of the source and the audio output device (111). In one or more embodiments, this comprises determining the distance between the ear of a user and the electronic device (101,102) or audio output device (111) of the electronic device (101,102).

Step 301 can be performed using optical proximity sensors 308 that determine whether the electronic device (101, 102) is less than the predefined distance threshold from the user's head. Alternatively, the distance can be measured at step 301 using thermal sensors 313, capacitive proximity sensors 309, pressure sensors 312, ultrasonic proximity sensors 310, radar sensors 311, or an imager 122. Other distance-measuring sensors will be obvious to those of ordinary skill in the art having the benefit of this disclosure. For example, the imager 122 can simply take an image of the user's head to determine if the ear is less than the predefined distance threshold from the electronic device (101,102) as well.

Step 301 can be performed using a touch sensitive display, such as display (107), display (108), or display (211), to determine whether a person's cheek touches or hovers over the display (107,108,211). Where it does, the electronic device (101,102) is confirmed to be less than the predefined distance threshold from the electronic device (101,102).

Step 301 can comprise determining a distance between a source and the audio input device (110). Step 301 can comprise determining a distance between a source output of the source and the audio input device (110). In one or more embodiments, this comprises determining the distance between the mouth of a user and the electronic device (101,102) or audio input device (110) of the electronic device (101,102).

Step 301 can be performed using a volatile organic compound sensor 316, carbon dioxide sensor 315, or humidity sensor 314 detecting a person's breath at the audio input device (110) to determine if the user's mouth is less than the predefined distance threshold from the electronic device (101,102) or the audio input device (110) of the electronic device (101,102).

Electronic devices can also be configured to detect whether the mouth is close to the audio input device (110) using the beam steering engine (120) determine a direction from which the audio input is received. Accordingly, step 301 can also comprise determining a direction from which audio input is received at the audio input device (110). As described above, the beam steering engine 120 can determine a direction from which audio input is received to determine whether the audio input is likely intended for the electronic device (101,102).

For example, the beam steering engine (120) can determine whether the audio input travels in a direction from the user's mouth toward the audio input device (110). This directional determination can be used to confirm—or alternatively detect—whether the mouth is close to the audio input device (110). Other techniques for determining whether the mouth is close to the microphone will be obvious to those of ordinary skill in the art having the benefit of this disclosure. For example, an imager 122 can capture images of the user to determine whether they are close to the electronic device (101,102), and so forth.

In one or more embodiments, step 301 can additionally include determining the orientation of the electronic device (101,102) in three-dimensional space using the orientation detector 124 to determine whether the tilt of the electronic device (101,102) indicates that audio output device (111) of the electronic device (101,102) is near the ear. The orientation of the electronic device (101,102) in three-dimensional space can also be used to indicate the electronic device (101,102) is near the mouth. This information can be used to confirm—or alternatively detect—whether the mouth is close to the audio input device (110) and/or the ear is close to the audio output device (111). Where, for example, the orientation detector 124 detects a predefined amount of tilt, such as ten, twelve, or fifteen degrees, this measurement can be used to confirm—or alternatively detect—whether the mouth is close to the audio input device (110) and/or the ear is close to the audio output device (111). Other techniques for determining whether the mouth is close to the audio input device (110) and/or the ear is close to the audio output device (111) will be obvious to those of ordinary skill in the art having the benefit of this disclosure.

Decision 302 determines whether the distance between a user's ear (the source input of the source or audio output from the electronic device) and the electronic device (101, 102), or alternatively the distance between the user's ear and the audio output device (111) of the electronic device (101,102) is less than a predefined distance threshold. Alternatively, or in addition, decision 302 determines whether the distance between the user's mouth (the source output of the source of audio input received by the electronic device), or alternatively the distance between the user's mouth and the audio input device (110) of the electronic device (101,102) is less than a predefined distance threshold. Optionally, decision 302 also determines whether the direction from which audio input is received is directed from a source of the audio input toward the electronic device (101,102). Optionally, decision 302 also determines whether the electronic device (101,102) is engaged in a telephonic or multimedia communication session where electronic signals comprising voice data are being exchanged with another electronic device.

Where one or more of these conditions are met, depending upon application, the method 300 moves to step 305 where the audio input is received. Thus, in one embodiment where the electronic device (101,102) is less than a predefined distance threshold from the user's head, the one or more processors (113) transition from a first mode of operation, where the one or more processors (113) execute control operations in response to device commands identified in audio input received by the audio capture device only when the device commands are preceded by a trigger phrase identified in the audio input, to a second mode of operation where the one or more processors (113) execute the control operations without requiring the trigger phrase when the device commands are received.

In another embodiment, where the electronic device (101, 102) is less than a predefined distance threshold from the user's head and no telephonic or multimedia communication session is occurring, the one or more processors (113) transition from the first mode of operation to the second mode of operation. In still another embodiment, where the electronic device (101,102) is less than a predefined distance threshold from the user's head, and no telephonic or multimedia communication session is occurring, and the direction from which the audio input is received is along a directional bearing oriented from the user's mouth toward the electronic device (101,102), the one or more processors (113) transition from the first mode of operation to the second mode of operation, and so forth.

As with the method (200) of FIG. 2, the method 300 of FIG. 3 can optionally attempt to determine the identity of the user from the audible input received at step 305 to confirm that the user is in fact intending to ask something of the electronic device (101,102). For example, the audio input/processor (117) can determine the identity of the user by matching a voiceprint extracted from the audio input received at step 305 to stored indicia, such as one or more predefined authorization references (119), corresponding to the user in memory (114). If the person asking a question is the owner of an electronic device (101,102), it is more likely that the question is intended for the electronic device than if asked by a stranger. Decision 306 determines whether the source of the audio input received at step 305 can be identified.

In one or more embodiments, the one or more processors (113) of the electronic device (101,102) execute control operations without requiring a trigger phrase to precede device commands at step 307 when an authorized user of the electronic device (101,102) is recognized via voice recognition, as determined by decision 306, and when the source of the audio input is less than a predefined distance threshold from the electronic device (101,102), as determined at decision 302. Otherwise, when the audible input is received at either step 303 or step 305, device commands not preceded by trigger phrases are ignored at step 304.

Figure 4:
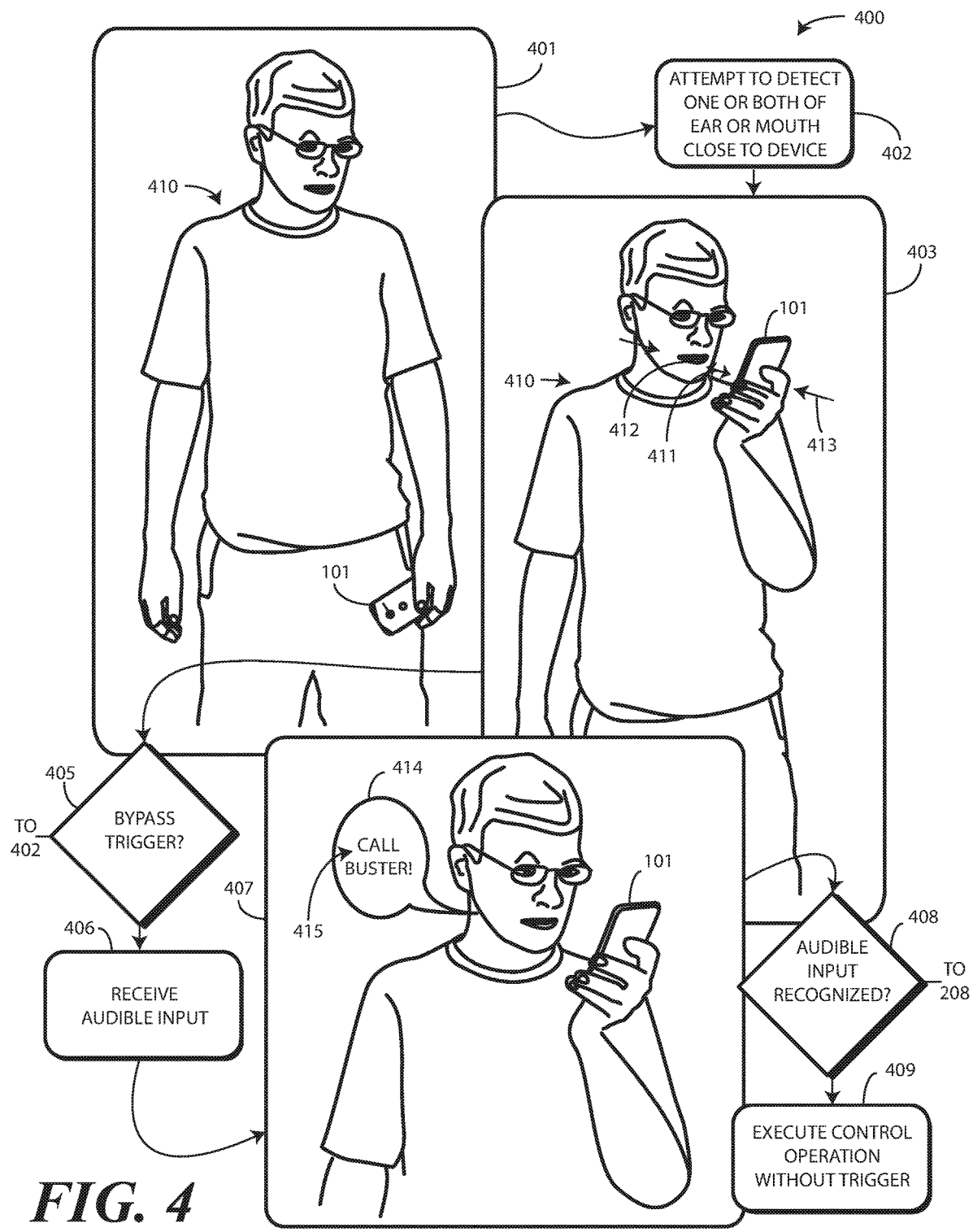
FIG. 4 illustrates another explanatory method in accordance with one or more embodiments of the disclosure.

Turning now to FIG. 4, illustrated therein is a method 400 that is explanatory example of the method (300) of FIG. 3. Beginning at step 401, a user 410 is holding an electronic device 101. The user 410 constitutes a source of audio input that can be received by the electronic device 101, as the user 410 can speak words that, when received by the audio input device (110), can be processed with the one or more processors (113) of the electronic device 101 executing control operations in response to the device commands.

At step 402, one or more sensors (121) of the electronic device 101 work to identify a predefined operating condition of the electronic device 101. In one or more embodiments, the one or more sensors (121) of the electronic device 101 determine the distance between predefined portions of the source and either the electronic device or a component of the electronic device. In this example, the predefined operating condition is either the distance between the source output (the user's mouth) of the source and the electronic device 101 or the audio input device (110) of the electronic device 101 being less than a predefined distance threshold, or the distance between the source input (the user's ear) of the source and the electronic device 101 or the audio output device (111) of the electronic device 101 being less than a predefined distance threshold.

As shown at step 401, the user 410 is holding the electronic device 101 below their waist. This means that the predefined condition is not met. Accordingly, the one or more processors (113) of the electronic device 101 are operating in a first mode of operation where the one or more processors (113) execute control operations in response to device commands identified in audio input received by the audio input device (110) only when the device commands are preceded by a trigger phrase identified in the audio input.

However, at step 403 the user has raised the electronic device 101 toward their mouth. Accordingly, the distance 411 between the source output 412 of the source and the audio input device (110) of the electronic device 101 being less than a predefined distance threshold 413, which is seven inches in this example.

Decision 405 determines that the predefined condition requirements are met. Step 406 then transitions the one or more processors (113) of the electronic device 101 from the first mode of operation to the second mode of operation where the one or more processors (113) execute control operations without requiring the trigger phrase when the device commands are received while the electronic device 101 is in the predefined operating condition.

At step 406, the audio input device (110) of the electronic device 101 receives audio input 414. In this example, the audio input 414 comprises a device command 415, which is to call Buster. There is no trigger phrase preceding the device command 415. In some embodiments, the one or more processors (113) would simply execute a control operation, e.g., initiating a telephonic call to Buster, due to the fact that the electronic device 101 is in the predefined operating condition when the device command 415, sans trigger phrase, is received.

However, in other embodiments extra checks can be used to ensure that the one or more processors (113) execute the control operations in response to the device command 415 under certain conditions. For example, where step 402 also includes the sensors (121) determining a direction from which the audio input 414 was received by the audio input device (110), in one or more embodiments the one or more processors (113) may execute a control operation only where that direction is directed at the electronic device 101 and the distance 411 between the source output 412 of the source and the audio input device (110) of the electronic device 101 is less than the predefined distance threshold 413, and so forth.

In this example, the audio input/processor (117) serves as a voice interface engine and attempts, at decision 408, to identify the source of the audio input 414 from the audio input 414. Where the audio input 4141 is identified as emanating from an authorized user of the electronic device 101, and in one embodiment only where the audio input 4141 is identified as emanating from an authorized user of the electronic device 101, the one or more processors (113) execute the control operation in response to the device command 415 without requiring the trigger phrase. Thus, as shown in FIG. 4, in one or more embodiments a user 410 can bypass the trigger phrase for the device command 415 simply by being authorized to use the electronic device 101 then lifting the electronic device 101 toward their mouth.

Figure 5:
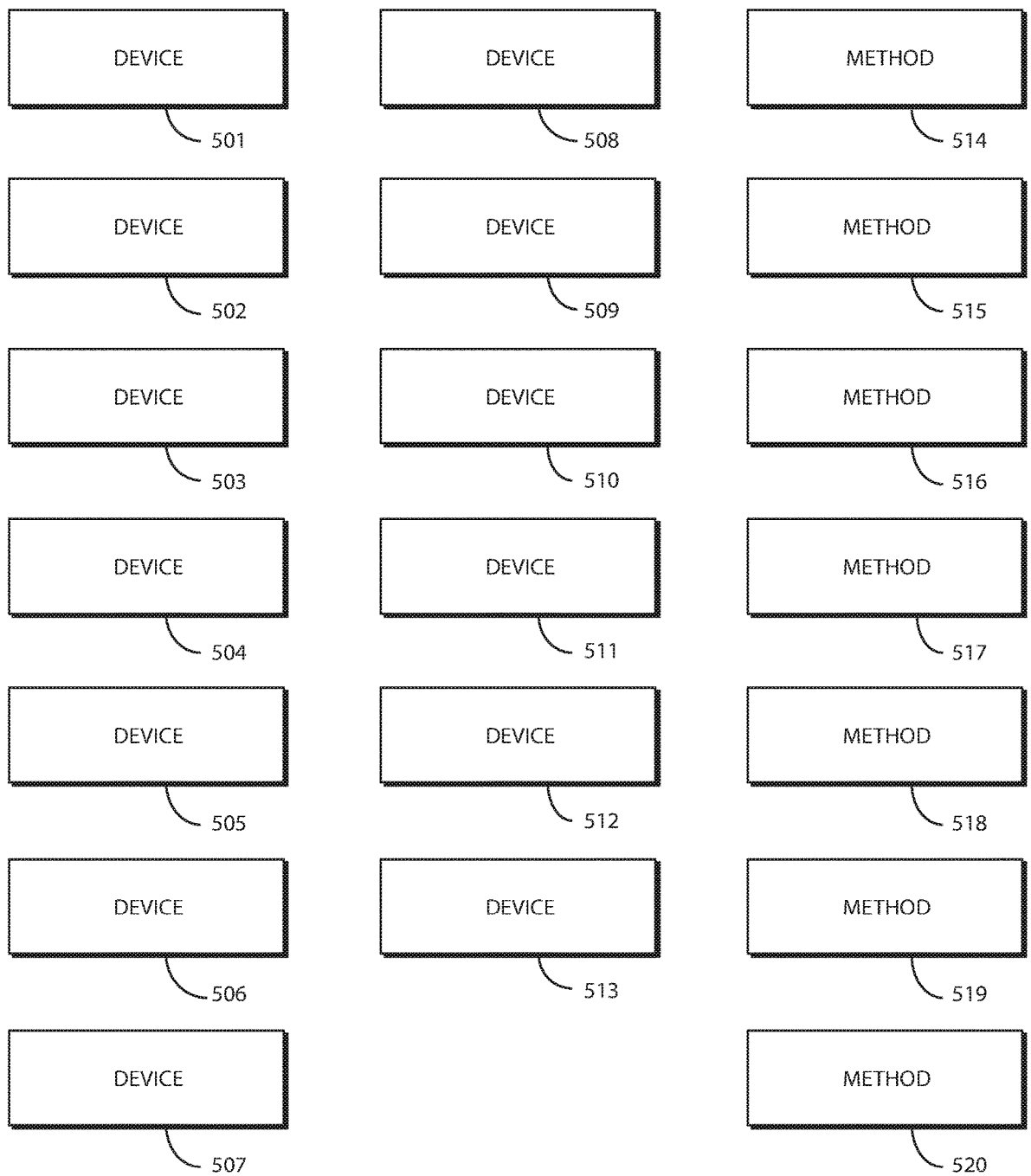
FIG. 5 illustrates various embodiments of the disclosure.

Turning now to FIG. 5, illustrated therein are various embodiments of the disclosure. At 501, an electronic device comprises an audio capture device receiving audio input. At 501, the electronic device comprises one or more processors, which are operable with the audio capture device.

At 501, the one or more processors are configured to execute a control operation in response to a device command preceded by a trigger phrase identified in the audio input when in a first mode of operation. However, at 501 the one or more processors transition from the first mode of operation to a second mode of operation in response to detecting a predefined operating condition of the electronic device and executing the control operation without requiring the trigger phrase to precede the device command.

At 502, the one or more processors of 501 execute the control operation without requiring the trigger phrase to precede the device command, but only when the device command is received while the electronic device is in the predefined operating condition.

At 503, the electronic device of 502 comprises a first device housing and a second device housing. At 503, the electronic device comprises a hinge coupling the first device housing to the second device housing. At 503, the first device housing is pivotable about the hinge relative to the second device housing between a closed position and an axially displaced open position. At 504, the predefined operating condition of 503 comprises the first device housing pivoting relative to the second device housing from the closed position to the axially displaced open position.

At 505, the electronic device of 504 further comprises a timer operable with the one or more processors. At 505, the one or more processors actuate the timer in response to detecting the first device housing pivoting relative to the second device housing from the closed position to the axially displaced open position. At 505, the one or more processors transition from the second mode of operation to the first mode of operation upon expiration of the timer.

At 506, the electronic device of 502 further comprises one or more sensors operable with the one or more processors. At 506, the one or more sensors determine a distance between a source output of a source of the audio input and the electronic device. At 507, the predefined operating condition of 506 comprises the distance being less a predefined distance threshold.

At 508, the electronic device of 502 further comprises one or more sensors operable with the one or more processors. At 508, the one or more sensors determine a distance between a source input of a source of the audio input and the electronic device. At 509, the predefined condition of 508 comprises the distance being less than a predefined distance threshold.

At 510, the electronic device of 502 further comprises one or more sensors operable with the one or more processors. At 510, the one or more sensors determine a direction from which the audio input was received by the audio capture device. At 511, the predefined operating condition of 510 comprises the direction being directed from a source of the audio input toward the audio capture device.

At 512, the electronic device of 511 further comprises a voice interface engine operable with the one or more processors. At 512, the voice interface engine attempts identification of a source of the audio input from the audio input. At 513, the one or more processors of 512 execute the control operation only when the voice interface engine identifies the source of the audio input as an authorized user of the electronic device.

At 514, a method in an electronic device comprises identifying, with one or more sensors of the electronic device, a predefined operating condition of the electronic device. At 514, the method comprises transitioning one or more processors operable with the one or more sensors from a first mode of operation to a second mode of operation when the electronic device is in the predefined condition. At 514, the one or more processors execute control operations in response to device commands identified in audio input received by an audio capture device only when the device commands are preceded by a trigger phrase identified in the audio input in the first mode of operation. At 514, the one or more processors execute the control operations without requiring the trigger phrase when the device commands are received while the electronic device is in the predefined operating condition in the second mode of operation.

At 515, the predefined operating condition of 514 comprises a first device housing of the electronic device pivoting about a hinge relative to a second device housing from a closed position to an axially displaced open position. At 516, the method of 515 further comprises initiating, by the one or more processors, a timer in response to the one or more sensors identifying commencement of the predefined operating condition. At 516, the method comprises transitioning from the second mode of operation to the first mode of operation upon expiration of the timer.

At 517, the predefined operating condition of 514 comprises a distance between the audio capture device and a source output of a source of the audio input being below a predefined distance threshold. At 518, the predefined operating condition of 514 comprises a distance between an audio output device and a source input of a source of the audio input being below a predefined distance threshold. At 519, the predefined operating condition of 514 comprises a direction from which the audio input was received by the audio capture device being directed at the electronic device. At 520, the one or more processors execute the control operations without requiring the trigger phrase only where the audio input is identified as emanating from an authorized user of the electronic device.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising:
   an audio capture device receiving audio input; and
   one or more processors, operable with the audio capture device, and configured to execute a control operation in response to a device command preceded by a trigger phrase identified in the audio input when in a first mode of operation;
   the one or more processors transitioning from the first mode of operation to a second mode of operation in response to detecting a predefined operating condition of the electronic device and executing the control operation without requiring the trigger phrase to precede the device command;
   the predefined operating condition of the electronic device comprising a first device housing of the electronic device pivoting about a hinge relative to a second device housing from a closed position to an axially displaced open position.

2. The electronic device of claim 1, the one or more processors executing the control operation without requiring the trigger phrase to precede the device command when the device command is a call to action.

3. The electronic device of claim 1, the predefined operating condition further comprising an absence of an occurrence of an incoming call while:
the first device housing pivots about the hinge relative to the second device housing between the closed position and the axially displaced open position.

4. The electronic device of claim 1, further comprising one or more flex sensors detecting the first device housing pivoting relative to the second device housing from the closed position to the axially displaced open position.

5. The electronic device of claim 1, further comprising a timer operable with the one or more processors, the one or more processors actuating the timer in response to detecting the first device housing pivoting relative to the second device housing from the closed position to the axially displaced open position and transitioning from the second mode of operation to the first mode of operation upon expiration of the timer.

6. The electronic device of claim 1, further comprising one or more sensors operable with the one or more processors, the one or more sensors determining a distance between a source output of a source of the audio input and the electronic device.

7. The electronic device of claim 6, the predefined operating condition further comprising the distance being less than a predefined distance threshold.

8. The electronic device of claim 1, further comprising one or more sensors operable with the one or more processors, the one or more sensors determining a distance between a source input of a source of the audio input and the electronic device.

9. The electronic device of claim 8, the predefined operating condition comprising the distance being less than a predefined distance threshold.

10. The electronic device of claim 1, further comprising one or more sensors operable with the one or more processors, the one or more sensors determining a direction from which the audio input was received by the audio capture device.

11. The electronic device of claim 1, the one or more processors ignoring the device command unless the device command is preceded by the trigger phrase when the first device housing of the electronic device pivots about the hinge relative to the second device housing from the axially displaced open position to the closed position.

12. The electronic device of claim 11, further comprising the one or more processors prompting for the trigger phrase when the electronic device is in the closed position.

13. The electronic device of claim 1, the one or more processors executing the control operation only when a source of the audio input is identified as an authorized user of the electronic device.

14. A method in an electronic device, the method comprising:
identifying, with one or more sensors of the electronic device, a predefined operating condition of the electronic device; and
transitioning one or more processors operable with the one or more sensors from a first mode of operation, where the one or more processors execute control operations in response to device commands identified in audio input received by an audio capture device only when the device commands are preceded by a trigger phrase identified in the audio input, to a second mode of operation where the one or more processors execute the control operations without requiring the trigger phrase when the device commands are received while the electronic device is in the predefined operating condition;
the predefined operating condition of the electronic device comprising a first device housing of the electronic device pivoting about a hinge relative to a second device housing from a closed position to an axially displaced open position.

15. The method of claim 14, the first device housing of the electronic device pivoting about the hinge relative to a second device housing from the closed position to axially displaced open position exposing a display of the electronic device.

16. The method of claim 14, further comprising:
initiating, by the one or more processors, a timer in response to the one or more sensors identifying commencement of the predefined operating condition; and
transitioning from the second mode of operation to the first mode of operation upon expiration of the timer.

17. The method of claim 14, the predefined operating condition further comprising a distance between the audio capture device and a source output of a source of the audio input being below a predefined distance threshold.

18. The method of claim 14, the predefined operating condition further comprising a distance between an audio output device and a source input of a source of the audio input being below a predefined distance threshold.

19. The method of claim 14, further comprising the one or more processors further prompting for confirmation prior to executing the control operations without requiring the trigger phrase when the device commands.

20. The method of claim 14, the one or more processors executing the control operations without requiring the trigger phrase only where the audio input is identified as emanating from an authorized user of the electronic device.

* * * * *